(12) United States Patent
Marin et al.

(10) Patent No.: US 6,298,232 B1
(45) Date of Patent: Oct. 2, 2001

(54) VOICE MAIL SERVICE NOTIFICATION BETWEEN MOBILE SYSTEMS

(75) Inventors: Jose Luis Marin; Miguel Matrinez; Almudena Prieto; Jesus de Viguri, all of Madrid (ES)

(73) Assignee: Telefonaktiebolaget LM Ericsson (publ), Stoclkholm (SE)

( * ) Notice: Subject to any disclaimer, the term of this patent is extended or adjusted under 35 U.S.C. 154(b) by 0 days.

(21) Appl. No.: 09/231,767

(22) Filed: Jan. 15, 1999

(51) Int. Cl.[7] ................................................... H04M 11/00
(52) U.S. Cl. ...................... 455/413; 455/426; 455/432; 455/466
(58) Field of Search ...................... 455/426, 412, 455/413, 417, 466, 432; 379/88.13, 84, 88.04, 100.08

(56) References Cited

U.S. PATENT DOCUMENTS

| 5,610,974 |   | 3/1997 | Lantto . |
|---|---|---|---|
| 5,627,877 | * | 5/1997 | Penttonen ........................... 455/413 |
| 5,742,905 |   | 4/1998 | Pepe et al. . |
| 6,072,862 | * | 6/2000 | Srinivasan ...................... 379/100.08 |

FOREIGN PATENT DOCUMENTS

| 758 835 A2 | 2/1997 | (EP) . |
|---|---|---|
| 2 280 085A | 1/1995 | (GB) . |
| 98/46034 | 10/1998 | (WO) . |

OTHER PUBLICATIONS

Digital Cellular Telecommunications System (Phase 2+); Technical Realization of the Short Message Service (SMS); Point–to–Point (PP) (Global System for Mobile Communications); 03.40 version 6.1.0 Release 1997); European Telecommunications Standards Institute, pp. 1–116.

Common PCN Handset Specification (CPHS); Version 3.2; Copyright (c) PCN Association, pp. 1–89; (1995).

Digital Cellular Telecommunications System (Phase 2+); Technical Realization of the Short Message Service (SMS); Point–to–Point (PP) (Global System for Mobile Communications); 03.40 version 7.1.0 Release 1998); European Telecommunications Standards Institute, pp. 1–118.

* cited by examiner

*Primary Examiner*—Lee Nguyen
(74) *Attorney, Agent, or Firm*—Burns, Doane, Swecker & Mathis, L.L.P.

(57) ABSTRACT

The present invention concerns the provision of voice message notifications to a mobile subscriber regardless of the type of network in which the mobile subscriber is located. An interworking function translates a first voice message notification from first protocol associated with a first network into a second voice message notification according to a second protocol associated with a second network. The first and second networks may be a GSM network and an IS-41 network. The first or the second voice message notification may be a qualification directive, an SMS message or an SMS message which includes a CPHS voice message waiting indicator.

34 Claims, 10 Drawing Sheets

| Home Net. Mobile Subs No. | Visited Net. Mobile Subs No. | Specific Subs. Data |
|---|---|---|
| 517000000001 | 214000000001 | Value |

| Home Net. Mobile Subs No. | Visited Net. Mobile Subs No. | MWI |
|---|---|---|
| 517000000001 | 214000000001 | 0/1 |

| Home Net. Mobile Subscriber Number | String |
|---|---|
| 3419999999 | "Pls, call to 123" |

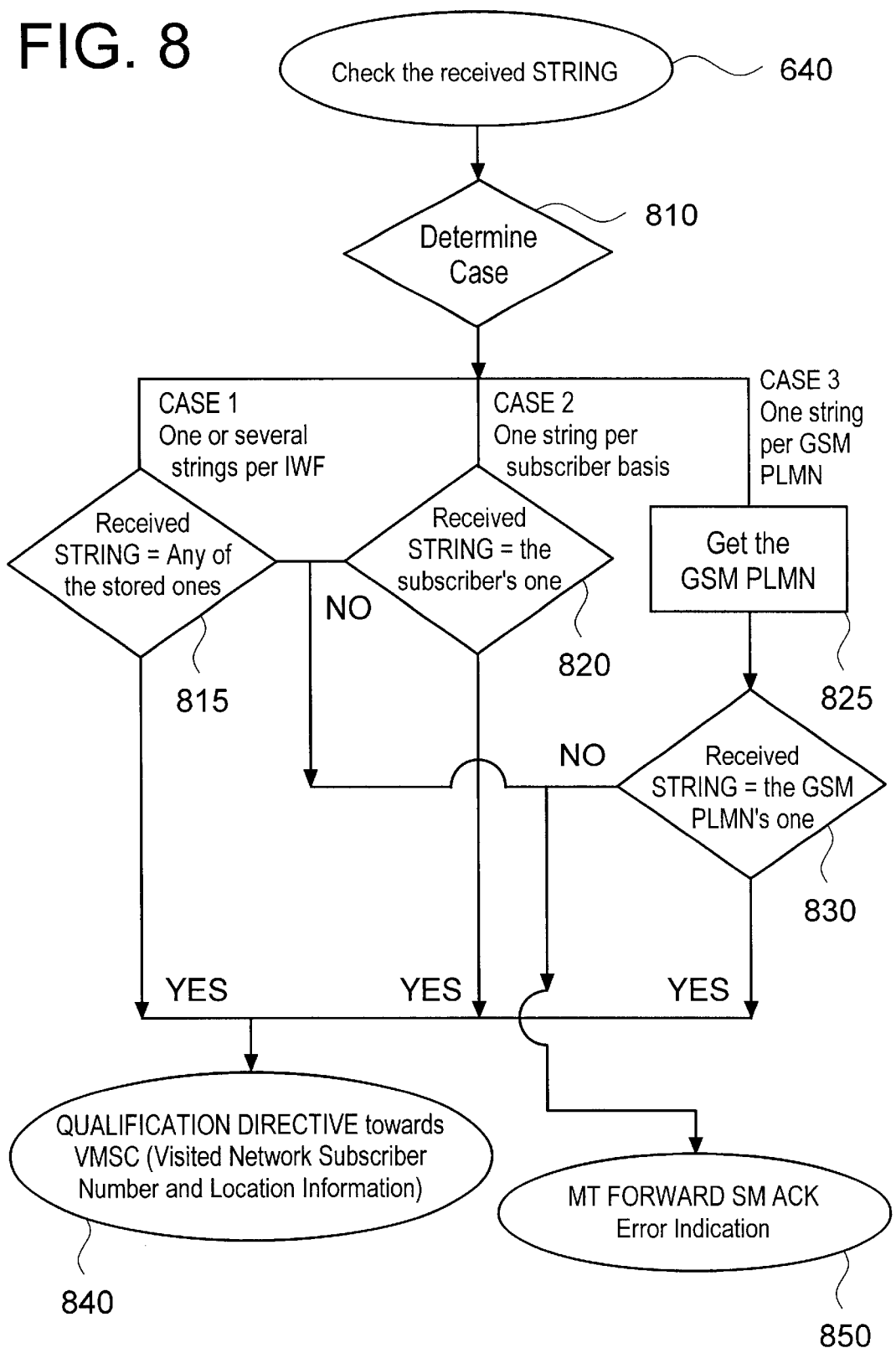

VOICE MAIL SERVICE NOTIFICATION BETWEEN MOBILE SYSTEMS

BACKGROUND

The present invention generally relates to mobile communication systems and methods for signaling in mobile communication systems and, more particularly, to systems and methods for communicating voice message notifications between mobile communication systems which operate according to different, incompatible, protocols.

Voice mail systems (VMS) enable a subscriber to receive messages when the subscriber is unable to take a telephone call. VMS's are very popular among cellular telephone users because they allow people to leave messages for the cellular telephone user, when the user is unavailable, e.g., the cellular telephone has been turned off. As cellular technology has advanced, various methods have been devised for alerting a cellular telephone subscriber that a voice mail message has been received.

One type of cellular communication system is known as the Global System for Mobile Communications (GSM). The GSM describes what was originally a European standard (and now is being used in many areas of the world) for mobile communication which is intended to provide uniformity so that users can access different mobile communication systems with minimal equipment compatibility problems. The GSM network normally uses the Short Message Service (SMS) to notify a mobile station that a voice mail message has been received by the VMS. SMS is a message function service which provides for the transmission of short text messages having up to, for example, 160 alphanumeric characters to be sent to a subscriber at his or her mobile unit. For a more complete discussion of SMS in GSM systems the interested reader is referred to U.S. patent application Ser. No. 08/779,642, Astrom et al., which is herein incorporated by reference and to GSM T.S. 03.40.

FIG. 1 is a node diagram illustrating the signaling between nodes in a GSM system when a service center (SC) receives a voice mail message for a subscriber. When the SC receives a voice mail message for a subscriber, the SC sends an SMS message containing a voice message notification to the service center/gateway mobile switching center (SC/GMSC). Upon receipt of the SMS message with a voice message notification, the SC/GMSC sends a send routing information (SRI) for the short message (SM) to the GSM home location register (HLR). The HLR sends the routing information back to the SC/GMSC in an SRI for SM acknowledgment (ACK). Using the routing information received from the HLR, the SC/GMSC forwards the voice message notification to the mobile switching center/visited location register (MSC/VLR) where the subscriber is currently located, in a mobile terminated (MT) Forward SM message. Upon receipt of the MT Forward SM message, the MSC/VLR attempts to contact the mobile station, (not shown), in order to notify the mobile station that the subscriber has received a voice message. After attempting to notify the mobile, a MT Forward SM ACK message is sent to the SC/GMSC containing an indication of whether the VLR/MSC has successfully communicated the voice message notification to the mobile station. The SC/GMSC then sends a SMS ACK message to the SC indicating whether or not the voice message notification has been received by the mobile station.

Many cellular telephone networks in the United States use the IS-41 standard for signaling. The IS-41 standard defines, among other things, the use of a qualification directive message as a voice message notification to indicate to a mobile subscriber that the VMS has received a voice mail message for the mobile subscriber. FIG. 2 illustrates the signaling between nodes when an SC, located in a network which uses a signaling protocol in accordance with the IS-41 standard, receives a voice mail message for a subscriber. When the SC receives a voice mail message for a subscriber, the SC sends a VMS indication to an IS-41 HLR. The IS-41 HLR determines where the subscriber is currently located and sends a qualification directive to the visited mobile switching center (VMSC) where the subscriber is located. The VMSC then attempts to notify the mobile station (not shown) that a voice message has been received for the subscriber. The VMSC sends a qualification directive ACK to the IS-41 HLR indicating whether or not the mobile station has received the voice message notification. The IS-41 HLR sends a VMS indication ACK to the SC indicating whether or not the mobile station has received the voice message notification.

Dual mode cellular telephones have been developed to allow people who travel between different cellular systems to use a single cellular telephone in both systems. Accordingly, if a European businessperson travels between Europe and the United States often, then the businessperson would purchase a dual mode cellular telephone which can operate according to air interface standards of both systems. In order to allow roaming between different systems, network providers have set up roaming agreements such that the European businessperson can make telephone calls while roaming in the United States and the telephone calls will be billed to the businessperson's account with the European cellular provider.

In order to perform protocol adaptation for signaling between different cellular communication networks and to provide various other functions for intersystem roaming an interworking function (IWF) is used. For instance, in the aforementioned example the IWF allows the businessperson's account to be billed for the out of system telephone calls, e.g., the calls made in a network which operates according to the IS-41 protocol. For example, U.S. Pat. No. 5,610,974 issued to Lantto, which is herein incorporated by reference, teaches an IWF wherein a user of a first mobile network which operates according to a first protocol can receive calls while the user is located in an area served by a second mobile network which operates according to a second protocol using the same telephone number which is used to reach the user in the first network.

However, roaming agreements and dual mode cellular telephones still fail to provide the European businessperson with the ability to be notified of the receipt of voice mail messages by the VMS while roaming in a network which uses an IS-41 protocol. Accordingly, the businessperson must continually call the VMS, in his home network, to determine whether any new voice mail messages have been received. This can be very time consuming and expensive.

From the foregoing, it is apparent that conventional techniques for roaming between two mobile networks which operate according to different signaling protocol standards fail to provide voice message notifications to roaming subscribers. Accordingly, it would be desirable to provide a method and system which allow voice message notifications to be received while a mobile subscriber to a first network which operates according to a first protocol is roaming in a second network which operates according to a second protocol.

SUMMARY

In accordance with one aspect of the present invention, an interworking function provides home network functionality to a subscriber roaming in a visited network which operates according to a different protocol. The interworking function receives a first message from a first node according to a first protocol associated with a first network. The interworking function converts the first message from the first protocol into a second voice message notification according to a second protocol associated with a second network. The second voice message notification is sent to a second node according to the second protocol associated with the second network.

In accordance with another aspect of the present invention, a mobile communications system provides voice message notifications for a subscriber. A voice message system service center located in a first network receives a voice message and sends a first voice message notification to a first node according to a first protocol associated with the first network. The first node receives the first voice message notification and converts the first voice message notification from the first protocol into a second voice message notification according to a second protocol associated with a second network. The first node forwards the second voice message notification, in accordance with the second protocol, to the subscriber located in the second network.

BRIEF DESCRIPTION OF THE DRAWINGS

The foregoing objects, features and advantages of the present invention will be more readily understood upon reading the following detailed description in conjunction with the drawings in which:

FIG. 3 illustrates an exemplary record in an IWF database;

FIG. 7 illustrates another exemplary record in an IWF database;

FIG. 8 illustrates different methods in which the IWF can determine whether an SMS message contains a VMS notification;

FIG. 9 illustrates yet another exemplary record in an IWF database;

DETAILED DESCRIPTION

Exemplary embodiments of the present invention are concerned with an IWF which performs the needed protocol conversion in order to allow voice message notifications to be received by a subscriber to a first network which operates according to a first protocol while the subscriber is roaming in a second network which operates according to a second protocol.

In order to implement an IWF according to exemplary embodiments of the present invention, a database is built for the subscribers who are roaming in networks, other than their home network. Accordingly, FIG. 3 illustrates an exemplary database record in the IWF database, for tracking a roaming subscriber. Field 302 contains the mobile subscriber's number in the home network, field 304 contains the subscriber number assigned to the mobile subscriber by the visited network and field 306 contains data which is used in the translation of the voice message notification. Therefore, by retrieving the record from the IWF database, the IWF has all of the information which is necessary for translation of the signaling messages between both networks. Organization and manipulation of the database is accomplished through an operations and maintenance interface (O&M). Table 1 illustrates exemplary man machine language (MML) commands used to performs different actions on the database through the O&M interface.

TABLE 1

| Exemplary Syntax | Description of Command |
| --- | --- |
| ADDSUB <HomeNetMobileSubscriberNo>, <VisitedNetMobileSubscriberNo> | Used to enter information regarding a new subscriber in the IWF database |
| DELSUB <HomeNetMobileSubscriberNo> | Delete Specific Subscriber Information from IWF database |
| PRINTSUB <HomeNetMobileSubscriberNo> | Print the information stored in the database for a specific subscriber |

Figure 1:
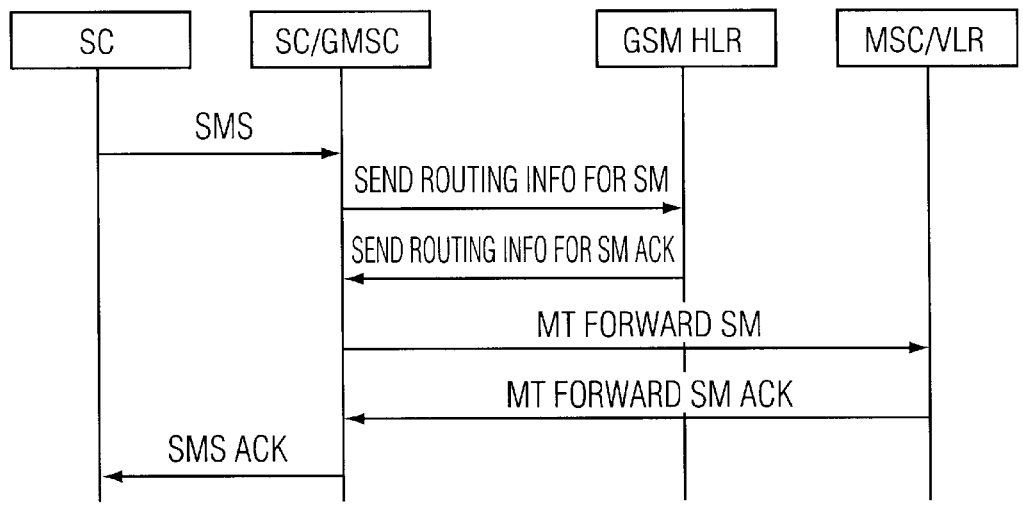
FIG. 1 illustrates a node map for routing messages in a GSM network.
Figure 2:
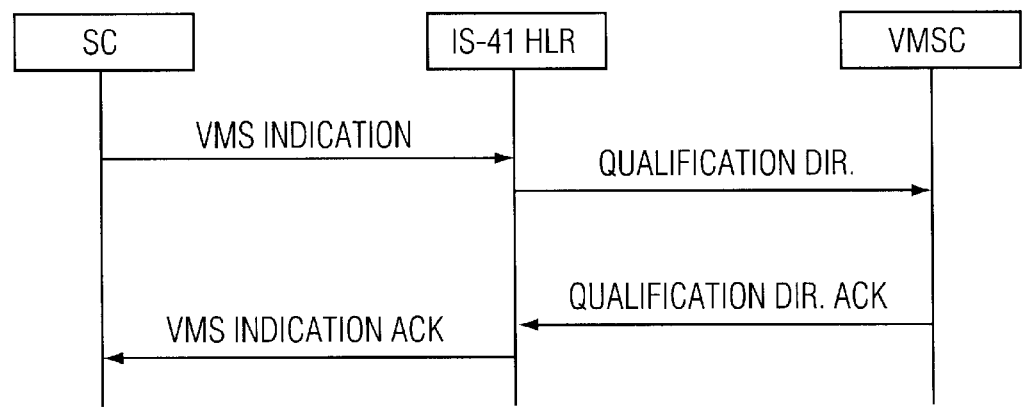
FIG. 2 illustrates a node map for routing messages in an IS-41 network.
Figure 4:
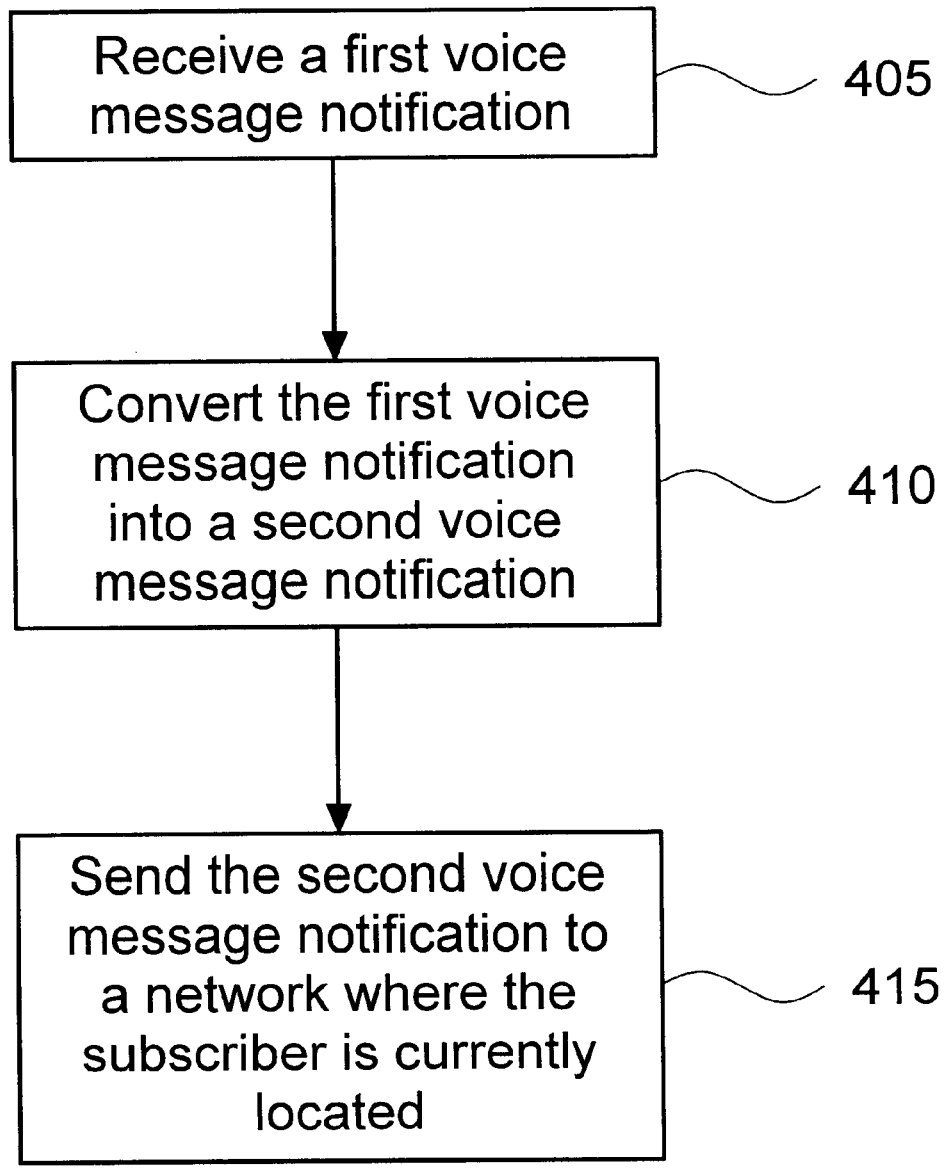
FIG. 4 illustrates the primary functions of the IWF according to an exemplary embodiment of the present invention.

FIG. 4 illustrates the primary functions of an IWF according to an exemplary embodiment of the present invention. In step 405, the IWF receives a first voice message notification which is formatted according to a first protocol. In step 410, the IWF converts the first voice message notification into a second voice message notification, formatted in accordance with a second protocol. In step 415, the IWF sends the second voice message to a network where the subscriber is currently located, wherein the network uses the second protocol for internode signaling.

Figure 5:
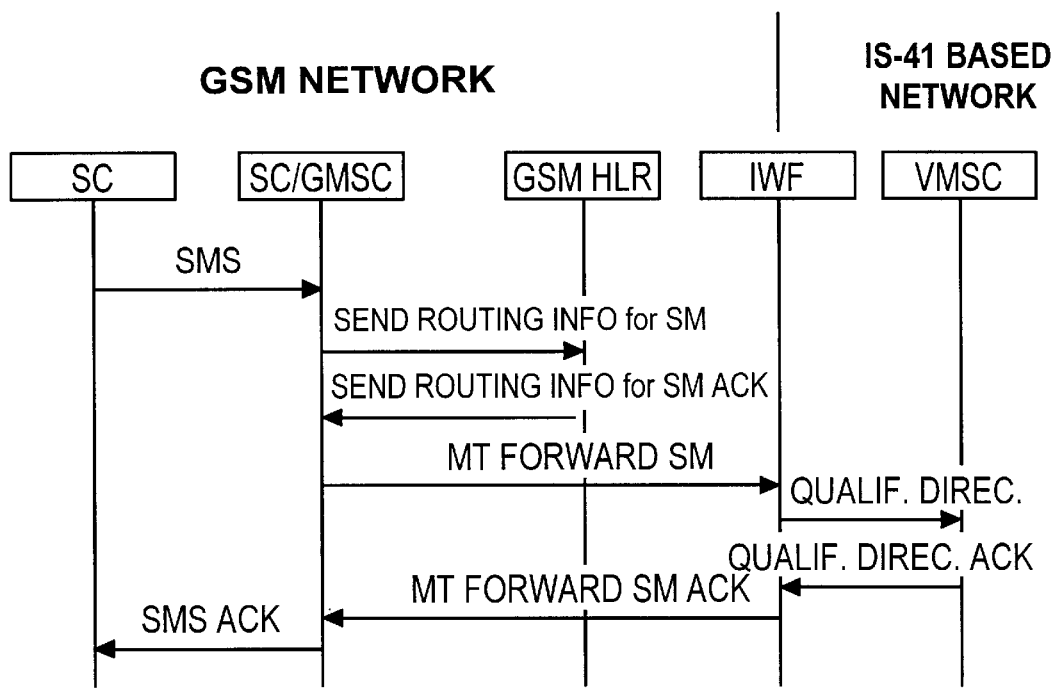
FIG. 5 illustrates a node map for routing messages according to an exemplary embodiment of the present invention.

FIG. 5 illustrates the traffic handling between nodes when a subscriber to a network which uses signaling according to the GSM standard (herein referred to as the GSM network) is roaming in a network which uses signaling according to the IS-41 standard (herein referred to as the IS-41 network). When the SC receives a voice mail message, the SC sends an SMS message containing a voice message notification to the SC/GMSC. In response to the SMS message from the SC, the SC/GMSC sends an SRI for SM message to the GSM/HLR, so that the SC/GMSC can route the SMS message to the appropriate node where the mobile subscriber is currently located. In response to the SRI message from the SC/GMSC, the HLR located in the GSM network (GSM HLR) returns an SRI for SM ACK message informing the SC/GMSC of the location of the mobile subscriber. According to an exemplary embodiment of the present invention, the GSM HLR informs the SC/GMSC of the address of the IWF. The SC/GMSC then sends a MT Forward SM message to the IWF, informing the IWF that mobile subscriber has received a voice message.

Figure 6A:
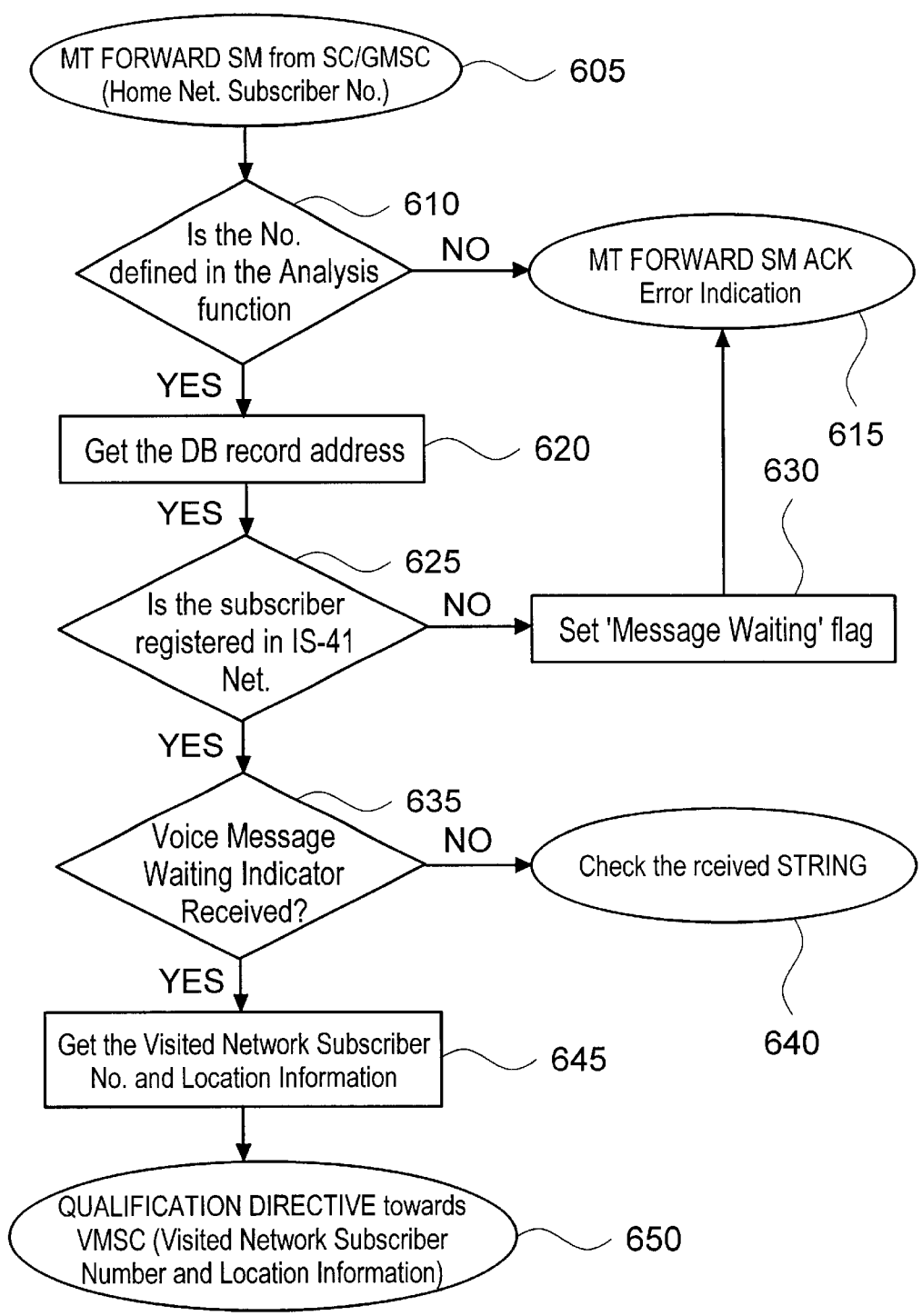
FIG. 6A illustrates an exemplary operation of the IWF when an SMS message is received.

FIG. 6A illustrates the operation of the IWF when an SMS message is received according to a first exemplary embodiment of the present invention. More specifically, FIG. 6A illustrates the operation of the IWF in response to a MT Forward SM message. Accordingly, in step 605 a MT Forward SM message, including a home network subscriber number, is received by the IWF from the SC/GMSC. In step 610, a database analysis function is performed, wherein the home network subscriber number contained in the MT Forward SM message is used to determine if there is a corresponding entry in the IWF database. If there is not a corresponding entry in the IWF database, in accordance with the "NO" path out of decision block 610, then a MT Forward SM ACK message containing an error indication is sent from the IWF to the SC/GMSC, in accordance with step 615. It is noted that the use of an error indication in the MT Forward SM ACK message is merely exemplary and one skilled in the art will recognize that there are other ways in which the IWF can handle SMS messages which are not voice message notifications.

If there is a corresponding entry in the IWF database, in accordance with the "YES" path out of decision step 610, then the corresponding database record is retrieved, according to step 620. In step 625 it is determined whether the subscriber is registered in the IS-41 network. If the subscriber is not registered in the IS-41 network, in accordance with the "NO" path out of decision step 625, then the message waiting flag is set in the database record, in accordance with step 630. After, the message waiting flag is set, a MT Forward SM ACK message containing an error indication is sent back to the SC/GMSC, in accordance with step 615. FIG. 7 illustrates an exemplary database record in the IWF database for storing a message waiting flag. The database record contains the home network subscriber number 705, the visited network subscriber number 710 and a message waiting indicator field 715. If a subscriber is not currently active in the network when a voice message notification is received, the message waiting indicator flag is set indicating the receipt of a voice message notification by the IWF. When the subscriber later becomes active in the network, the IWF will recognize that the subscriber has a voice message waiting indicator flag, and the IWF will send a Note MS Present message towards the GSM/HLR in order to restart the voice message notification delivery procedure.

If the subscriber is registered in the IS-41 network, in accordance with the "YES" path out of decision step 625, then it is determined whether a voice message waiting indicator, in accordance with Common PCN Handset Specification (CPHS) version 3.2 1995, which is herein incorporated by reference, has been received. The CPHS voice message waiting indicator identifies an SMS message that has originated from a VMS. However, since not all VMSs support the CPHS voice message waiting indicator, alternate methods of indicating that an SMS is a voice message notification must be provided. Accordingly, if the CPHS voice message waiting indicator is not included in the SMS message, in accordance with the "NO" path out of decision block 635, the received text string is checked in accordance with step 640, which is described below in conjunction with FIG. 8. However, if the CPHS voice message waiting indicator is included in the SMS message, in accordance with the "YES" path out of decision step 635, then the visited network subscriber number and the location information for the qualification directive is retrieved from the database record in step 645. In step 650, a qualification directive is sent to a VMSC in accordance with the visited network subscriber number contained in the database record and the location information regarding the VMSC where the subscriber is currently located.

As discussed earlier, not all voice mail systems support the use of the CPHS voice message waiting indicator in an SMS message. Accordingly, another method is needed in order to identify SMS messages containing voice message notifications from SMS messages which are intended as regular SMS text messages between mobile stations. FIG. 8 illustrates three different methods which an IWF uses to determine whether an SMS message contains a voice message notification. In step 640 the text string contained in the SMS message is received and checked. Each home network of different mobile subscribers may be using a different one of the three methods illustrated in FIG. 8 for indicating that an SMS message contains a voice message notification. The network operator sets in the IWF, at the time of initial configuration by O&M means, the method which the home network will use to identify SMS messages which contain a voice message notification. Accordingly, in step 810, the IWF determines which method the home network will be using to identify voice message notifications.

The first method of identifying voice message notifications to the IWF is identified as case 1 in FIG. 8. The home network defines one or several text strings per IWF which the VMS will use in an SMS message to indicate that the SMS message is a voice message notification. These text strings will be the same for all subscribers of the home network. Therefore, if the IWF determines that the home network is identifying voice message notifications using one or several text strings per IWF, then the received text string is compared to any of the text strings stored in the IWF, in accordance with step 815. If the received text string matches a stored text string, then the IWF uses the visited network subscriber number and the location information for the qualification directive, and sends a qualification directive to the VMSC in accordance with the visited network subscriber number and the location information, in accordance with step 840. However, if the received text string does not match any of the text strings stored in the IWF, in accordance with the "NO" path out of decision step 815, then a MT Forward SM ACK message containing an error indication is sent to the VMS, according to step 850.

Table 2 illustrates exemplary MML commands used for interacting with the IWF database which contains the text strings associated with the IWF, through the O&M interface, in accordance with the first method.

TABLE 2

| Exemplary Syntax | Command Description |
| --- | --- |
| ADDSTR <String> | Adding a new string to the table |
| DELSTR <String> | Deleting a string from the table |
| PRINTSTRTABLE | Print information stored in the table |

The second method that the home network can use to identify SMS messages as voice message notifications, is by assigning one or several text strings per subscriber. FIG. 9 illustrates an exemplary database record for use with the second method for text string identification. The database in the IWF will contain a record similar to the one illustrated in FIG. 9, wherein the home network mobile subscriber number 905 is associated with a specific text string 910. Therefore, if the IWF determines, in step 810, that the home network is identifying voice message notifications on a per subscriber basis, then the received text string is compared to the text string(s) associated with the subscriber, in accordance with step 820. If the received text string matches the subscriber's text string, in accordance with the "YES" path out of decision step 820, then, in step 840, a qualification directive is sent to the VMSC in accordance with the visited network subscriber number and the location information. However, if the received text string does not match the text string(s) associated with the home network mobile subscriber number stored in the database, in accordance with the "NO" path out of decision step 820, then a MT Forward SM ACK message containing an error indication is sent to the VMS, in accordance with step 850.

The third method for identifying SMS messages which contain a voice message notification is to assign one or several text strings per PLMN. The third method is illustrated as case 3 in FIG. 8. Accordingly, if the IWF determines, in step 810, that the home network is identifying voice message notifications on a per PLMN basis, then the IWF retrieves the text string(s) associated with a particular PLMN, in accordance with step 825. The IWF use the home mobile network subscriber number to identify the PLMN and, in turn, the text string(s) associated with the PLMN. After the text string(s) associated with the particular PLMN is retrieved, the received text string in the SMS message is compared to the text string(s) associated with the PLMN. If the text strings match, in accordance with the "YES" path out of decision step 830, then, in step 840, a qualification directive is sent to the VMSC in accordance with the visited network subscriber number and the location information. However, if the text strings do not match, in accordance with the "NO" path out of decision step 830, then a MT Forward SM ACK message containing an error indication is sent to the VMS, according to step 850.

Figure 6B:
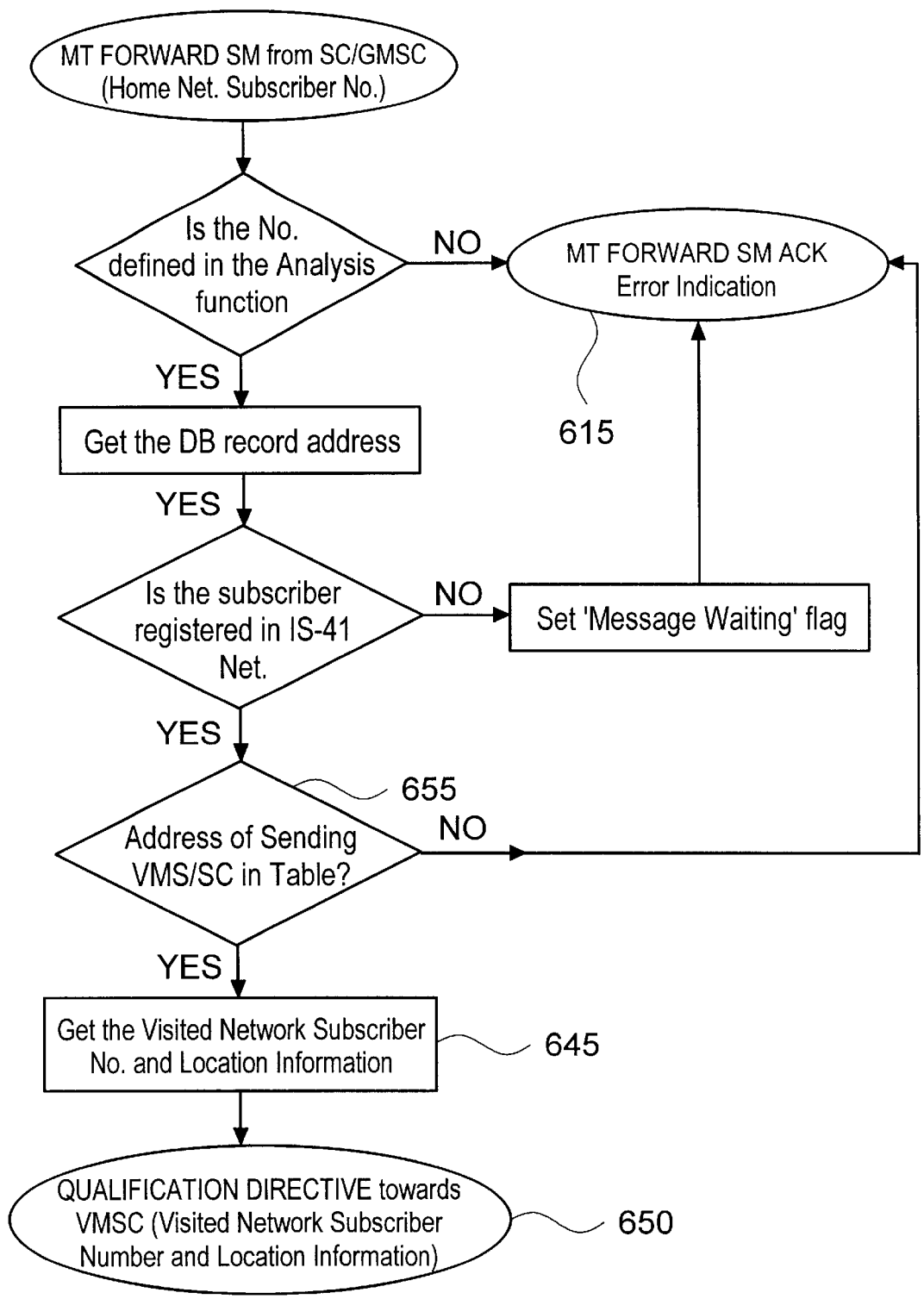
FIG. 6B illustrates an alternative exemplary operation of the IWF when an SMS message is received.

FIG. 6B illustrates an alternative embodiment of the present invention. In order to implement the method illustrated in FIG. 6B, the IWF builds a table of all the addresses of VMS's which are acting as service centers. Accordingly, whereas the embodiment described in regard to FIG. 6A uses either a CPHS voice message waiting indicator, in accordance with step 635, or checks the received text string of the SMS message, in accordance with step 640, the present embodiment determines whether the address of the sending VMS/SC is stored in the aforementioned table, in accordance with step 655. If the address of the sending VMS/SC is not stored in the table, in accordance with the "NO" path out of decision step 655, then a MT Forward SM ACK message containing an error indication is sent to the SC/GMSC, in accordance with step 615. However, if the address of the sending VMS/SC is stored in the table, in accordance with the "YES" path out of decision step 655, then the visited network subscriber number and the location information for the qualification directive are retrieved, in accordance with step 645. In step 650, a qualification directive is sent to the VMSC in accordance with the visited network subscriber number and the location information.

Figure 10:
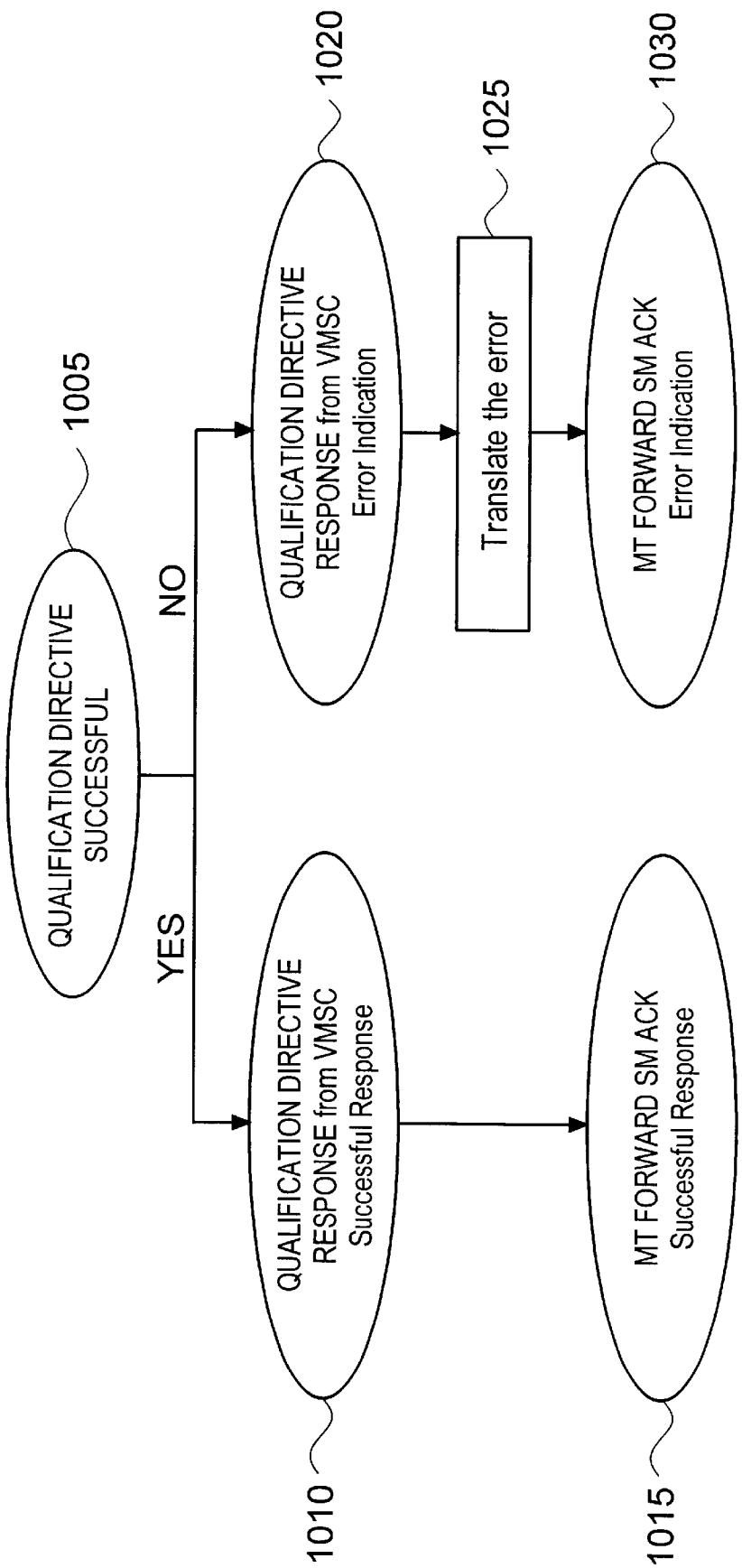
FIG. 10 illustrates the acknowledgment responses of the VMSC and IWF.

Referring again to FIG. 5, after a qualification directive has been issued from the IWF to the VMSC, the VMSC issues a qualification directive acknowledgment to the IWF. FIG. 10 illustrates the acknowledgment responses of the VMSC and IWF. Referring now to FIG. 10, in step 1005 the VMSC determines whether the qualification directive was successfully received by the VMSC. If the qualification directive was successfully received, in accordance with the "YES" path out of decision step 1005, then a qualification directive response is sent from the VMSC to the IWF indicating that the qualification directive has been successfully received, in accordance with step 1010. In response to the qualification directive the IWF sends a MT Forward SM ACK to the SC/GMSC indicating that the voice message notification has been successfully received in accordance with step 1015. However, if the qualification directive is not successfully received, in accordance with the "NO" path out of decision step 1005, then a qualification directive response is sent to the IWF containing an error indication, in accordance with step 1020. In step 1025 the IWF translates the error into the proper GSM error message. In step 1030, the IWF sends a MT Forward SM ACK containing an error indication to the SC/GMSC. As illustrated in FIG. 5, the SC/GMSC, upon receipt of the MT Forward SM ACK message, forwards an SMS ACK message to the SC indicating whether the voice message notification has been successfully received at the VMSC.

Figure 11:
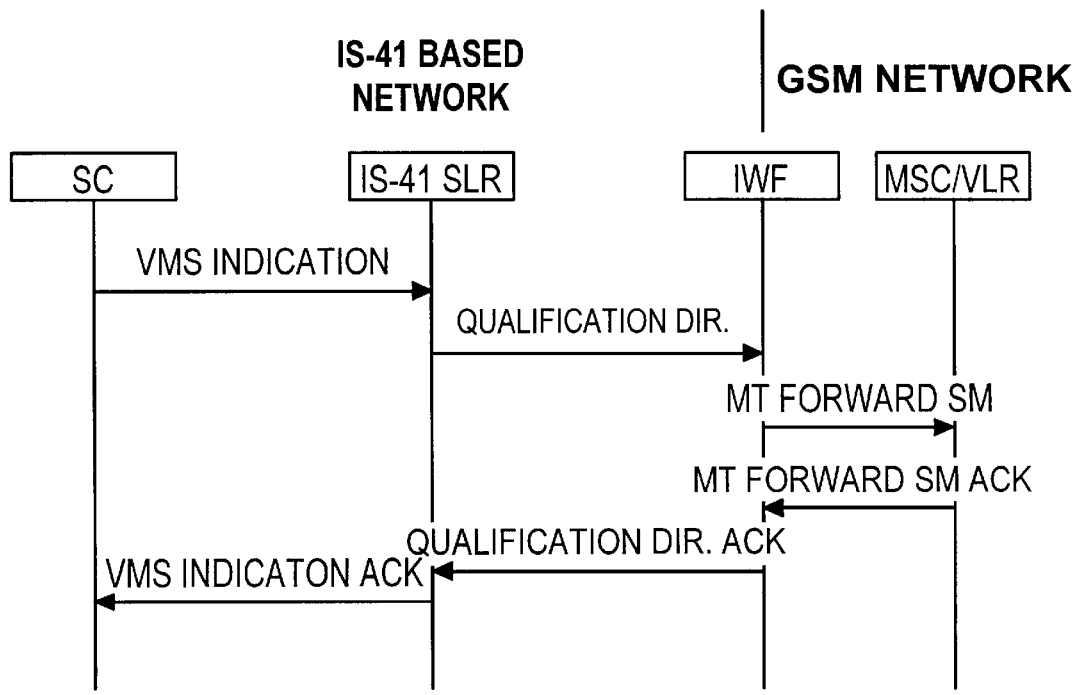
FIG. 11 illustrates node map for routing messages according to another exemplary embodiment of the present invention.

The interworking function of the present invention is also applicable in the situation when a mobile subscriber to a IS-41 network is roaming in a GSM network. Accordingly, FIG. 11 illustrates the traffic handling at the network level when the subscriber to the IS-41 based network receives a voice mail message while roaming in a GSM network. After the receipt of a voice mail message for the mobile subscriber, the SC sends a VMS indication, i.e., a specific type of voice message notification, to the HLR located in the IS-41 network (IS-41 HLR). The IS-41 HLR sends a qualification directive to the IWF. In response, the IWF generates a MT Forward SM message and sends it to the MSC/VLR where the subscriber is currently located. In response to the MT Forward SM message, the MSCJVLR generates and sends to the IWF a MT Forward SM ACK message indicating whether the mobile station has received the voice message notification. The IWF, in response to the MT Forward SM ACK message, sends a qualification directive ACK message to the IS-41 HLR. The IS-41 HLR, in turn, sends a VMS indication ACK message to the originating SC.

Figure 12:
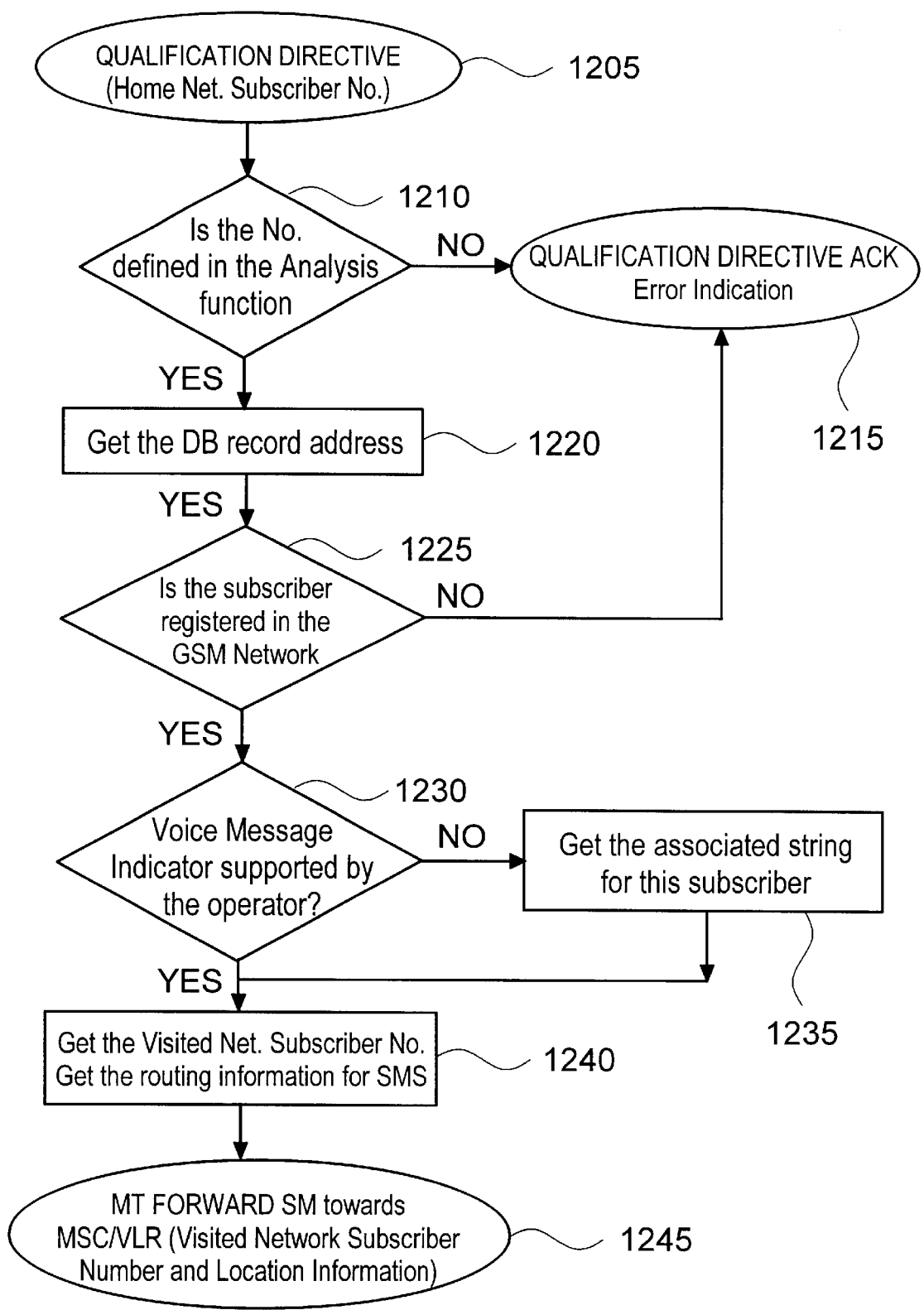
FIG. 12 illustrates an exemplary operation of the IWF when a qualification directive is received.

FIG. 12 illustrates the traffic handling at the IWF level, when a mobile subscriber to an IS-41 network receives a voice mail message while roaming in a GSM network. Accordingly, in step 1205 the IWF receives the qualification directive containing the home network subscribers number. In step 1210 it is determined whether the IWF database contains a record for the home network subscribers number. If it is determined that the database does not contain a record for the home network subscribers number, in accordance with the "NO" path out of decision step 1210, then the IWF sends a qualification directive ACK message to the IS-41 HLR containing an error indication, in accordance with step 1215. However, if the home network subscriber number is contained in a record in the database, in accordance with the "YES" path out of decision step 1210, then the IWF retrieves the database record, in accordance with step 1220.

After the IWF retrieves the database record, the IWF determines whether the subscriber is registered in the GSM network, in accordance with step 1225. If the subscriber is not registered in the GSM network, in accordance with the "NO" path out of decision step 1225, then a qualification directive ACK message is sent to the IS-41 HLR containing an error indication, in accordance with step 1215. However, if it is determined that the subscriber is registered in the GSM network, in accordance with the "YES" path out of decision step 1225, then it is determined whether a CPHS voice message indicator is supported by the operator, in accordance with step 1230. If the use of the CPHS voice message indicator in an SMS message is not supported by the operator, in accordance with the "NO" path out of decision step 1230, then the IWF retrieves from it's database the associated SMS text string for the particular subscriber, in accordance with step 1235. The text string associated with the particular subscriber can be assigned on an IWF basis, on a subscriber basis, on a home network basis, or on a visited network basis.

If the use of the CPHS voice message indicator in an SMS message is supported by the operator, in accordance with the "YES" path out of decision step 1230, or after the associated text string for the subscriber is retrieved in step 1235, the visited network subscriber number and the location information for the SMS message are retrieved from the database record, in accordance with step 1240. Then in step 1245, the IWF sends an MT Forward SM message towards the MSC/VLR in accordance with the visited network subscriber number and the location information.

Table 3 illustrates exemplary MML syntax which can be used by the operations and maintenance (O&M) procedures in order to organize and manipulate the IWF database.

TABLE 3

| Exemplary Syntax | Description of Command |
|---|---|
| DEFSTR <String> | Define string, used to enter information regarding a new string |
| DELSTR <String> | Removal of the string |
| PRINTSTR | Print the string |

Figure 13:
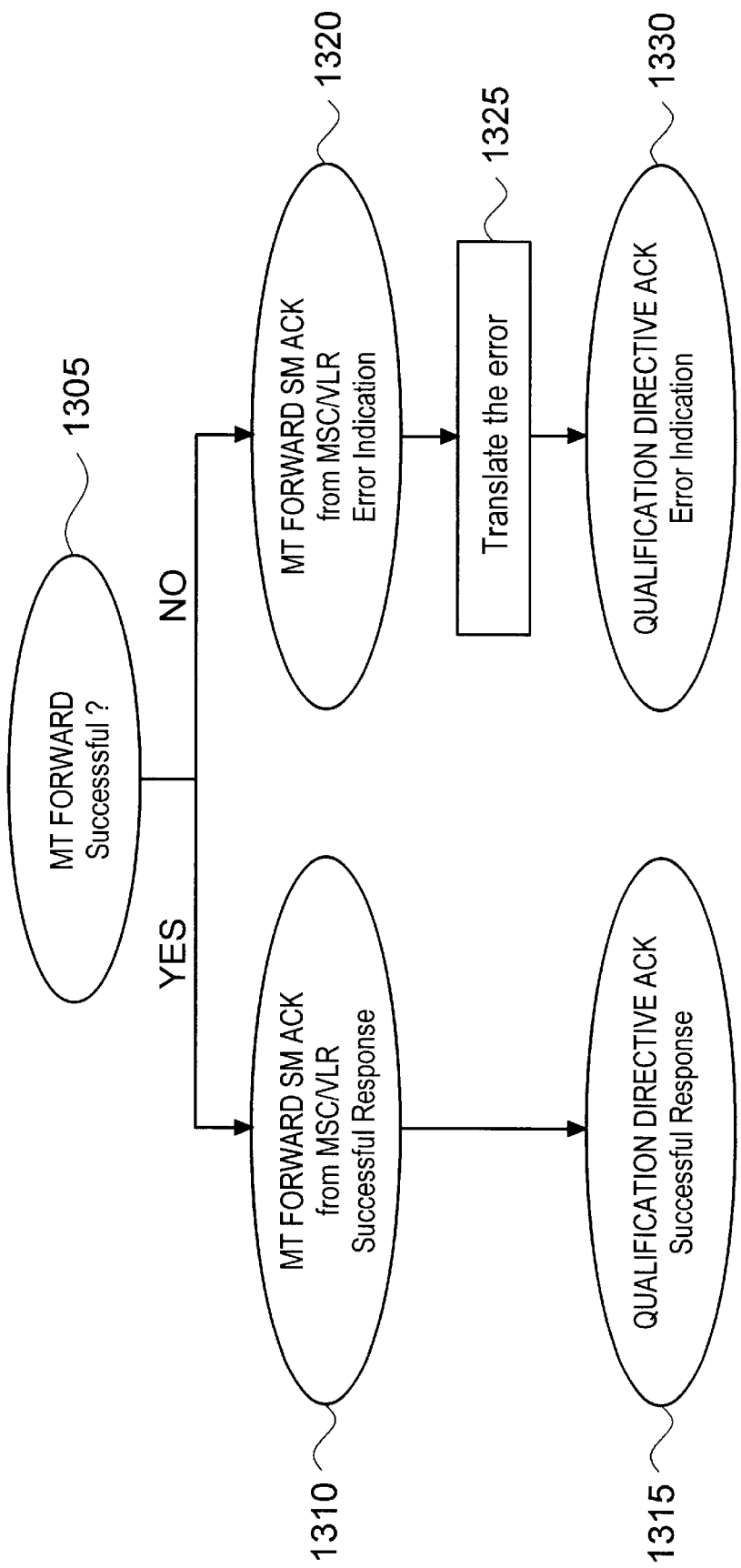
FIG. 13 illustrates the acknowledgment responses of the MSC/VLR and IWF.

As explained above, in regard to FIG. 11, after the MSC/VLR receives the MT Forward SM message, the MSC/VLR sends a MT Forward SM ACK message to the IWF. Referring now to FIG. 13, in step 1305 it is determined whether the MT Forward SM message has been successfully received. If the MT Forward SM message has been successfully received, in accordance with the "YES" path out of decision step 1305, then the MSC/VLR sends a MT Forward SM ACK message to the IWF indicating that the MT Forward SM message has been successfully received, in accordance with step 1310. The IWF then sends a qualification directive ACK message indicating that the voice message notification has been successfully delivered to the IS-41 HLR, in accordance with step 1315. However, if the MT Forward SM message was not successfully received, in accordance with the "NO" path out of decision step 1305, then a MT Forward SM ACK message is generated by the MSC/VLR containing an error indication, in accordance with step 1320. In step 1325, the IWF translates the error message into a proper IS-41 error message. Then in step 1330, the IWF sends a qualification directive ACK message to the IS-41 HLR containing an error indication. Referring again to FIG. 11, upon receipt of the qualified directive ACK message, the IS-41 HLR sends a VMS indication ACK message to the SC.

While the present invention has been described using the foregoing exemplary embodiments, these embodiments are intended to be illustrative in all respects, rather than restrictive of the present invention. For example, although the foregoing exemplary embodiments refer to GSM and IS-41 networks, those skilled in the art will also recognize that the present invention can also be applied to an IWF between other types of networks, e.g., UMTS, PDC, NMT, TACS. Thus, the scope of the present invention is instead set forth by the appended claims and encompasses any and all equivalents and modifications embraced thereby.

What is claimed is:

1. In a mobile communication system an interworking function which provides home network functionality to a subscriber roaming in a visited network which operates according to a different protocol, the interworking function comprising:

means for receiving a first message from a first node according to a first protocol associated with a first network;

means for converting said first message from said first protocol into a second voice message notification according to a second protocol associated with a second network;

means for sending said second voice message notification to a second node according to the second protocol associated with the second network.

2. The interworking function according to claim 1, further comprising of:

means for determining whether said first message is a first voice message notification.

3. The interworking function according to claim 2 wherein said means for determining further comprises:

means for determining whether said first message contains a CPHS voice message waiting indicator; and means for determining whether said first message contains a predetermined text string.

4. The interworking function according to claim 2, wherein said means for determining comprises:

means for determining whether said first message was sent from a voice message system.

5. The interworking function according to claim 1, further comprising:

means for determining whether said second network supports a CPHS voice message waiting indicator; and wherein said means for converting inserts said CPHS voice message waiting indicator into said second voice message notification if said second network supports said CPHS voice message waiting indicator.

6. The interworking function according to claim 1, further comprising:

means for determining whether said second network identifies voice message notifications using predetermined text strings; and means for inserting a predetermined text string into said second voice message notification.

7. The interworking function according to claim 2, further comprising:

a database;

means for performing a database analysis function, wherein a home network subscriber number from said first voice message notification is matched to a corresponding entry in said database; and means for retrieving said corresponding entry from said database, wherein said second voice message notification is sent to said second node using a visited network subscriber number which is contained in said corresponding entry.

8. The interworking function according to claim 7, further comprising:

means for determining whether a subscriber is registered in said second network; and means for setting a voice message waiting flag in a record in said database if said subscriber is not registered in said second network.

9. The interworking function according to claim 1, wherein said first protocol is a GSM protocol and said first message is an SMS message.

10. The interworking function according to claim 9, wherein said SMS message contains a CPHS voice message waiting indicator.

11. The interworking function according to claim 1, wherein said second protocol is a GSM protocol and said second voice message notification is an SMS message.

12. The interworking function according to claim 11, wherein said SMS message contains a CPHS voice message waiting indicator.

13. The interworking function according to claim 1, wherein said first protocol is an IS-41 protocol and said first message is a qualification directive.

14. The interworking function according to claim 1, wherein said second protocol is an IS-41 protocol and said second voice message notification is a qualification directive.

15. The interworking function according to claim 1, further comprising:
a database including operational and maintenance means to add, remove, and print strings in said database.

16. A mobile communications system for providing voice message notifications for a subscriber comprising:
means for receiving a voice message in a voice message system service center located in a first network;
means for sending a first voice message notification from said service center to a first node according to a first protocol associated with said first network;
means for receiving at the first node the first voice message notification;
means for converting said first voice message notification from said first protocol into a second voice message notification according to a second protocol associated with a second network; and
means for forwarding said second voice message notification, in accordance with the second protocol, to said subscriber located in said second network.

17. The system according to claim 16, wherein said first protocol is a GSM protocol, said first voice message notification is an SMS message, said second protocol is an IS-41 protocol and said second voice message notification is a qualification directive.

18. The system according to claim 17, wherein said SMS message contains a CPHS voice message indicator.

19. The system according to claim 16, wherein said first protocol is an IS-41 protocol, said first voice message notification is a qualification directive, said second protocol is a GSM protocol and said second voice message notification is an SMS message.

20. The system according to claim 19, wherein said SMS message contains a CPHS voice message indicator.

21. In a mobile communication system a method for providing home network functionality to a subscriber roaming in a visited network which operates according to a different protocol, the method comprising the steps of:
receiving a first message from a first node according to a first protocol associated with a first network;
converting said first message from said first protocol into a voice message notification according to a second protocol associated with a second network;
sending said second voice message notification to a second node according to the second protocol associated with the second network.

22. The method according to claim 21, further comprising the step of:
determining whether said first message is a first voice message notification.

23. The method according to claim 22 wherein said step of determining further comprises:
determining whether said first message contains a CPHS voice message waiting indicator; and
determining whether said first message contains a predetermined text string.

24. The method according to claim 22, wherein said step of determining comprises the step of:
determining whether said first message was sent from a voice message system.

25. The method according to claim 21, further comprising the steps of:
determining whether said second network supports a CPHS voice message waiting indicator; and
wherein said step of converting further comprises the step of inserting said CPHS voice message waiting indicator into said second voice message notification if said second network supports said CPHS voice message waiting indicator.

26. The method according to claim 21, further comprising the steps of:
determining whether said second network identifies voice message notifications using predetermined text strings; and
inserting a predetermined text string into said second voice message notification.

27. The method according to claim 22, further comprising the steps of:
performing a database analysis function, wherein a home network subscriber number from said first voice message notification is matched to a corresponding entry in said database; and
retrieving said corresponding entry from said database, wherein said step for sending is performed in accordance with a visited network subscriber number which is contained in said corresponding entry.

28. The method according to claim 27, further comprising the steps of:
determining whether a subscriber is registered in said second network; and
setting a voice message waiting flag in a record in said database if said subscriber is not registered in said second network.

29. The method according to claim 21, wherein said first protocol is a GSM protocol, said first message is an SMS message, said second protocol is an IS-41 protocol and said second voice message notification is a qualification directive.

30. The method according to claim 29, wherein said SMS message contains a CPHS voice message waiting indicator.

31. The method according to claim 21, wherein said first protocol is an IS-41 protocol, said first message is a qualification directive, said second protocol is a GSM protocol and said second voice message notification is an SMS message.

32. The method according to claim 31, wherein said SMS message contains a CPHS voice message waiting indicator.

33. The method according to claim 21, further comprising the steps of:
adding, removing or printing strings in a database using operational and maintenance commands.

34. In a mobile communication system, a method for receiving a voice mail notification comprising the steps of:

receiving a voice mail at a service center;

sending a message from the service center to a home location register associated with a subscriber, the message requesting the subscriber's current location;

sending a voice mail notification in a first protocol from the service center to a node associated with the current location of the subscriber if the node associated with the current location of the subscriber operates in accordance with the first protocol;

sending a voice mail notification in a first protocol from the service center to a node which converts the voice mail notification to a second protocol if the node associated with the current location of the subscriber operates in accordance with the second protocol; and forwarding the voice mail notification to the subscriber.

* * * * *